Patented Oct. 28, 1941

2,260,547

UNITED STATES PATENT OFFICE 2,260,547

PROCESS OF MANUFACTURING HALO-HYDRINS

Ludwig Valik, Rutherford, N. J., assignor to Burton T. Bush, Inc., New York, N. Y., a corporation of New Jersey No Drawing. Application April 15, 1939, Serial No. 268,123

5 Claims. (Cl. 260—634)

This invention relates to the manufacture of halo-hydrins and has for its object to provide an improved process for this purpose.

This application is a continuation in part of my copending application Serial No. 225,138, filed August 16, 1938.

It is well known that olefines react with hypochlorous acid or hypochlorite solutions to produce the corresponding chlorhydrins. This reaction applies not only to the simple olefines of the ethylene series but also to di-olefines and substituted olefines.

The literature describes numerous methods and means for accomplishing such reactions, for instance, it has been proposed to use various kinds of apparatus intended primarily to create a high dispersion of gases in liquids. Although some of the prior art methods and apparatus were satisfactory for effecting these reactions, there are situations in which they are ineffective and uneconomical. For example, the most important olefines, ethylene and propylene, are produced at the present time on a commercial scale mainly by cracking butane. Such a cracked mixture contains, for instance, 40% ethylene and 4% propylene and it is not simple to form the chlorhydrins in good yields directly from such a dilute gas mixture. The olefines are therefore first separated by compression and refrigeration before reactions are attempted, but even pure olefines require complicated vessels or towers to ensure a reasonable speed of reaction and high yield. There are also gas mixtures industrially available which are by-products and of little value at the present time because a small amount of a valuable gaseous ingredient, such as ethylene, is difficult or too expensive to extract by present procedures.

The present invention makes it possible to react such gas mixtures, as well as pure olefines, with hypohalous acid to produce halo-hydrins in a rapid and economical way. The invention is based upon the discovery that the reaction between a gas and a liquid, or the absorption of a gas in a liquid, can be facilitated and accelerated by adding to the liquid an agent which is capable of reducing the surface tension, commonly known as a surface-active, wetting or emulsifying agent. That is, I have found that if an aqueous solution has a tendency to react with or absorb gases passing through it, the speed and yields of the reaction or absorption are greatly increased by the addition of a wetting or emulsifying agent to the solution.

The invention is particularly useful for reacting dilute gas mixtures, as stated above, such as those derived from the cracking of butane or from other sources. It is also advantageous to apply my improved process to concentrated or pure olefines. In such cases my process operates to increase the speed of reaction by maintaining the greatest possible contact between the gaseous and liquid phases, employing comparatively small amounts of surface-active agents, specifically those agents which are sufficiently stable in hypohalous acid to facilitate the desired reaction before they are destroyed. Numerous groups of wetting and emulsifying agents are commercially available, and I have found that sulphated higher aliphatic alcohols, especially lauryl and oleyl alcohols, and more particularly their alkali metal salts of the general formula ROSO$_3$Me, such as the akali metal salts of lauryl hydrogen sulphate, are particularly suitable as such agents and are reasonably stable in hypohalous acid solutions. "Me" represents an alkali metal radical. Other surface-active agents derived from secondary aliphatic alcohols of high molecular weight, or sulfonated esters of alcohols and dibasic acids, or from other sources, may be successfully employed, depending upon their stability. Other examples of suitable agents are alkylaryl sulfonates, sulfated fatty acid amides, and others, but I do not limit myself to the use of any specific agent.

The following example will further illustrate the nature and scope of the invention, although the invention is not limited to this example.

Example

In a continuous process, chlorine is passed into water to which small amounts of a surface-active agent are added at intervals, producing hypochlorous acid more rapidly than would be possible without the presence of the surface-active agent. A gas mixture containing 39% ethylene and 5% propylene, derived from the cracking of butane, is passed through the hypochlorous acid solution in counter-current, preferably at 20-30° C., until a concentration of 8% chlorhydrins is reached. The solution of the surface-active agent is added dropwise preferably at such a rate that the total consumption of the agent is approximately 1 gram for each 80 grams of chlorhydrins formed. A yield of 77.6% chlorhydrins and 0.5% olefin chlorides results. In a comparative experiment employing the same apparatus and conditions, but without the addition of a surface-active agent, the yield dropped to 39.2% chlorhydrins and increased to 1.4% olefin chlorides. The vent gases were rich in ethylene. The presence of a surface-active agent therefore almost doubles the chlorhydrin yield.

It will therefore be understood that the invention is capable of various other modifications not specifically described herein but included within the scope of the appended claims. The terms "olefin" and "ethylene" in the claims include the relatively pure gases as well as gas mixtures containing these materials such as those gas mixtures previously mentioned.

The invention claimed is:

1. Process of manufacturing halo-hydrins which comprises reacting olefines with an aqueous solution of hypohalous acid, said solution containing a surface-active agent selected from the group consisting of sulphated higher aliphatic alcohols and their alkali metal salts, sulphates of secondary aliphatic alcohols of high molecular weight, sulphonated esters of alcohols and dibasic acids, arylalkyl sulphonates and sulphated fatty acid amides.

2. Process of manufacturing ethylene chlorhydrin which comprises reacting ethylene with an aqueous solution of hypohalous acid, said solution containing a surface-active agent selected from the group consisting of sulphated higher aliphatic alcohols and their alkali metal salts, sulphates of secondary aliphatic alcohols of high molecular weight, sulphonated esters of alcohols and dibasic acids, arylalkyl sulphonates and sulphated fatty acid amides.

3. Process of manufacturing halo-hydrins which comprises reacting olefins with an aqueous solution of hypohalous acid, said solution containing an alkali metal salt of lauryl hydrogen sulphate.

4. Process of manufacturing ethylene chlorhydrin which comprises reacting ethylene with an aqueous solution of hypochlorous acid, said solution containing a surface-active agent selected from the group consisting of sulphated higher aliphatic alcohols and their alkali metal salts, sulphates of secondary aliphatic alcohols of high molecular weight, sulphonated esters of alcohols and dibasic acids, arylalkyl sulphonates and sulphated fatty acid amides.

5. Process of manufacturing ethylene chlorhydrin which comprises reacting ethylene with an aqueous solution of hypochlorous acid, said solution containing an alkali metal salt of lauryl hydrogen sulphate.

LUDWIG VALIK.